United States Patent
Tsuchigane et al.

(10) Patent No.: US 11,059,946 B2
(45) Date of Patent: Jul. 13, 2021

(54) GLASS FIBER-REINFORCED RESIN MOLDED ARTICLE

(71) Applicant: NITTO BOSEKI CO., LTD., Fukushima (JP)

(72) Inventors: Akane Tsuchigane, Fukushima (JP); Yuya Onodera, Fukushima (JP); Yuta Takahashi, Fukushima (JP); Tadashi Kurita, Fukushima (JP); Tsunefumi Aizawa, Fukushima (JP)

(73) Assignee: Nitto Boseki Co., Ltd., Fukushima (JP)

(*) Notice: Subject to any disclaimer, the term of this patent is extended or adjusted under 35 U.S.C. 154(b) by 63 days.

(21) Appl. No.: 16/470,028

(22) PCT Filed: Jun. 29, 2017

(86) PCT No.: PCT/JP2017/024042
§ 371 (c)(1),
(2) Date: Jun. 14, 2019

(87) PCT Pub. No.: WO2017/171101
PCT Pub. Date: Oct. 5, 2017

(65) Prior Publication Data
US 2020/0079919 A1  Mar. 12, 2020

(30) Foreign Application Priority Data

Dec. 26, 2016 (JP) .............................. JP2016-252078

(51) Int. Cl.
| C03C 3/087 | (2006.01) |
| C08K 7/14 | (2006.01) |
| C08L 101/00 | (2006.01) |
| C08J 5/04 | (2006.01) |
| B29C 45/00 | (2006.01) |

(52) U.S. Cl.
CPC .............. *C08J 5/043* (2013.01); *C03C 3/087* (2013.01); *C08K 7/14* (2013.01); *C08L 101/00* (2013.01); *B29C 45/0001* (2013.01); *C08K 2201/003* (2013.01); *C08K 2201/004* (2013.01)

(58) Field of Classification Search
CPC . C08J 5/043; C03C 3/087; C08K 7/14; C08K 2201/003; C08K 2201/004; C08L 101/00; B29C 45/0001
USPC ........................................................ 524/494
See application file for complete search history.

(56) References Cited

U.S. PATENT DOCUMENTS

| 7,612,002 B2 | 11/2009 | Creux et al. |
| 2003/0054936 A1* | 3/2003 | Tamura .................... C03C 3/118 501/35 |
| 2006/0287185 A1* | 12/2006 | Creux .................. H05K 1/0366 501/36 |
| 2010/0256262 A1 | 10/2010 | Masaki et al. |
| 2012/0064788 A1* | 3/2012 | Peters ...................... C08K 7/14 442/173 |

FOREIGN PATENT DOCUMENTS

| JP | 11-292567 A | 10/1999 |
| JP | 2000-309707 A | 11/2000 |
| JP | 2000309707 A | * 11/2000 |
| JP | 2006-520314 A | 9/2006 |
| JP | 2012-211270 A | 11/2012 |
| JP | 2012-214347 A | 11/2012 |
| JP | 2016-033209 A | 3/2016 |
| WO | 2011/155362 A1 | 12/2011 |

\* cited by examiner

*Primary Examiner* — Kelechi C Egwim
(74) *Attorney, Agent, or Firm* — Carrier Blackman & Associates, P.C.; Joseph P. Carrier; Anne G. Sabourin

(57) ABSTRACT

Provided is a glass fiber-reinforced resin molded article having high tensile strength and high impact strength in combination with a low dielectric constant and a low dissipation factor. The glass fiber-reinforced resin molded article contains: 10 to 90 mass % of a glass fiber; and 90 to 10 mass % of a resin based on the total amount of the glass fiber-reinforced resin molded article, wherein the glass fiber has composition containing: 52.0 to 57.0 mass % of $SiO_2$; 13.0 to 17.0 mass % of $Al_2O_3$; 15.0 to 21.5 mass % of $B_2O_3$; 2.0 to 6.0 mass % of MgO; 2.0 to 6.0 mass % of CaO; 1.0 to 4.0 mass % of $TiO_2$; and less than 1.5 mass % of $F_2$, and the total amount of $Li_2O$, $Na_2O$, and $K_2O$ is less than 0.6 mass %, based on the total amount of the glass fiber, and the glass fiber has a number-average fiber length of 30 to 5000 μm.

3 Claims, No Drawings

GLASS FIBER-REINFORCED RESIN MOLDED ARTICLE

TECHNICAL FIELD

The present invention relates to a glass fiber-reinforced resin molded article.

BACKGROUND ART

Conventionally, glass fibers are widely used to enhance strength of resin molded articles in various applications, and such resin molded articles are increasingly used for housings or parts in electronic devices including smartphones and laptop computers. Such smartphones, laptop computers, and so forth are frequently carried about, and consequently frequently subjected to impact due to falling or the like. For this reason, the resin molded articles as mentioned above are required to have not only tensile strength, flexural strength, and a flexural modulus, but also high impact strength.

When the resin molded article as mentioned above is used for a housing or part in the electronic device as mentioned above, the resin molded article disadvantageously generates heat because glass generally absorbs energy as heat from alternating currents.

Here, dielectric energy loss to be absorbed by glass is proportional to the dielectric constant and dissipation factor depending on the components and structure of the glass, and expressed as the following expression (1).

$$W = kfv^2 \times \varepsilon \tan \delta \qquad (1)$$

In the expression, W denotes dielectric energy loss, k denotes a constant, f denotes frequency, $v^2$ denotes potential gradient, $\varepsilon$ denotes a dielectric constant, and tan $\delta$ denotes a dissipation factor. It is understood from the expression (1) that the higher the dielectric constant and dissipation factor are, or the higher the frequency is, the higher the dielectric energy loss is, resulting in larger heat generation by the resin molded article. Thus, the resin molded articles as mentioned above are required to have not only high impact strength, but also a low dielectric constant and a low dissipation factor.

Glass fibers having E glass composition (E glass fibers) (the composition containing: 52.0 to 56.0 mass % of $SiO_2$; 12.0 to 16.0 mass % of $Al_2O_3$; 20.0 to 25.0 mass % in total of MgO and CaO; and 5.0 to 10.0 mass % of $B_2O_3$ based on the total amount of the glass fiber) are the most commonly used for the above-mentioned glass fibers. Glass fibers having S glass composition (S glass fibers) (the composition: 64.0 to 66.0 mass % of $SiO_2$; 24.0 to 26.0 mass % of $Al_2O_3$; and 9.0 to 11.0 mass % of MgO based on the total amount of the glass fiber) are known as glass fibers capable of imparting extremely high strength to resin compositions and molded articles thereof. However, the S glass composition is known to be disadvantageous in that it provides high 1000-Poise temperature (temperature at which the viscosity of a melt of a glass composition reaches 1000 Poise (100 Pa·s)) and high liquid phase temperature (temperature at which precipitation of crystals first takes place when the temperature of a melt of a glass composition is lowered), and a narrow working range (a temperature range suitable for production of a glass fiber), which is represented as difference between those two temperatures, and thus production of S glass fibers is not necessarily easy.

Glass fibers being capable of imparting higher strength to resin molded articles than E glass fibers do and having manufacturability superior to those of S glass fibers have been demanded in recent years, and the present applicants have proposed a glass fiber having composition containing: 57.0 to 63.0 mass % of $SiO_2$; 19.0 to 23.0 mass % of $Al_2O_3$; 10.0 to 15.0 mass % of MgO; and 4.0 to 11.0 mass % of CaO, provided that the total content of $SiO_2$, $Al_2O_3$, MgO, and CaO is 99.5 mass % or more, based on the total amount of the glass fiber (see Patent Literature 1).

Use of the glass fiber described in Patent Literature 1 can impart higher tensile strength, higher flexural strength, and a higher flexural modulus to resin molded articles than in using any E glass fiber.

CITATION LIST

Patent Literature

Patent Literature 1: International Patent Publication No. WO 2011/155362

SUMMARY OF INVENTION

Technical Problem

However, glass fiber-reinforced resin molded articles containing the glass fiber described in Patent Literature 1 are disadvantageous in that the impact strength is comparable to or lower than those of glass fiber-reinforced resin molded articles containing any E glass fiber.

In addition, E glass has a high dielectric constant and high dissipation factor, and glass fiber-reinforced resin molded articles containing any E glass fiber disadvantageously cause large heat generation when used for a housing or part in the electronic device as mentioned above.

An object of the present invention is to provide a glass fiber-reinforced resin molded article, to overcome the disadvantages, having high tensile strength and high impact strength in combination with a low dielectric constant and a low dissipation factor.

Solution to Problem

To achieve the object, the glass fiber-reinforced resin molded article according to the present invention contains: a glass fiber in a range of 10 to 90 mass %; and a resin in a range of 90 to 10 mass % based on a total amount of the glass fiber-reinforced resin molded article, wherein the glass fiber has composition containing: $SiO_2$ in a range of 52.0 to 57.0 mass %; $Al_2O_3$ in a range of 13.0 to 17.0 mass %; $B_2O_3$ in a range of 15.0 to 21.5 mass %; MgO in a range of 2.0 to 6.0 mass %; CaO in a range of 2.0 to 6.0 mass %; $TiO_2$ in a range of 1.0 to 4.0 mass %; and less than 1.5 mass % of $F_2$, provided that the total amount of $Li_2O$, $Na_2O$, and $K_2O$ is less than 0.6 mass %, based on the total amount of the glass fiber, and the glass fiber has a number-average fiber length in a range of 30 to 5000 μm.

The glass fiber-reinforced resin molded article according to the present invention advantageously has, by virtue of the glass fiber having the composition contained therein, high tensile strength and high impact strength in combination with a low dielectric constant and a low dissipation factor.

The glass fiber-reinforced resin molded article according to the present invention cannot achieve sufficient tensile strength and sufficient impact strength if the content of the glass fiber is less than 10 mass % or the content of the resin is more than 90 mass % based on the total amount of the glass fiber-reinforced resin molded article. On the other hand, it becomes difficult to produce the glass fiber-reinforced resin molded article according to the present invention if the content of the glass fiber is more than 90 mass % or the content of the resin is less than 10 mass % based on the total amount of the glass fiber-reinforced resin molded article.

To ensure the strength of the molded article and easy manufacture of the molded article in combination, the glass fiber-reinforced resin molded article according to the present invention preferably contains 20 to 70 mass % of the glass fiber and 80 to 30 mass % of the resin, more preferably contains 25 to 60 mass % of the glass fiber and 75 to 40 mass % of the resin, and even more preferably contains 30 to 50 mass % of the glass fiber and 70 to 50 mass % of the resin, based on the total amount of the glass fiber-reinforced resin molded article.

If the $SiO_2$ content in the glass fiber contained in the glass fiber-reinforced resin molded article according to the present invention is less than 52.0 mass % based on the total amount of the glass fiber, an excessively high dielectric constant is provided, concomitantly with lowering of the water resistance and the acid resistance, which deteriorates the glass fiber and the glass fiber-reinforced resin molded article. If the $SiO_2$ content in the glass fiber is more than 57.0 mass % based on the total amount of the glass fiber, on the other hand, the viscosity in spinning is excessively high, which may complicate fiber formation.

The $SiO_2$ content in the glass fiber is preferably 52.5 to 56.8 mass %, more preferably 53.0 to 56.6 mass %, even more preferably 53.5 to 56.5 mass %, particularly preferably 53.8 to 56.3 mass %, and most preferably 54.0 to 56.2 mass % based on the total amount of the glass fiber.

If the $Al_2O_3$ content in the glass fiber contained in the glass fiber-reinforced resin molded article according to the present invention is less than 13.0 mass % based on the total amount of the glass fiber, phase separation tends to occur, leading to poor water resistance. If the $Al_2O_3$ content in the glass fiber is more than 17.0 mass % based on the total amount of the glass fiber, on the other hand, the liquid phase temperature becomes higher to narrow the working range, resulting in difficulty in production of the glass fiber.

The $Al_2O_3$ content in the glass fiber is preferably 13.3 to 16.5 mass %, more preferably 13.7 to 16.0 mass %, even more preferably 14.0 to 15.5 mass %, particularly preferably 14.3 to 15.3 mass %, and most preferably 14.5 to 15.1 mass % based on the total mass of the glass fiber.

If the $B_2O_3$ content in the glass fiber contained in the glass fiber-reinforced resin molded article according to the present invention is less than 15.0 mass % based on the total amount of the glass fiber, an excessively high dielectric constant and dissipation factor are provided. If the $B_2O_3$ content in the glass fiber is more than 21.5 mass % based on the total amount of the glass fiber, on the other hand, the volume of $B_2O_3$ to be volatized in spinning is large, and cleavage of the glass fiber due to staining by $B_2O_3$ attached around a bushing nozzle will be found, which may cause problems with workability and productivity. Moreover, formation of homogeneous glass may fail and lead to excessively poor water resistance.

The $B_2O_3$ content in the glass fiber is preferably 15.5 to 21.0 mass %, more preferably 16.0 to 20.5 mass %, even more preferably 16.5 to 20.0 mass %, particularly preferably 17.0 to 19.5 mass %, and most preferably 17.5 to 19.4 mass % based on the total mass of the glass fiber.

If the MgO content in the glass fiber contained in the glass fiber-reinforced resin molded article according to the present invention is less than 2.0 mass % based on the total amount of the glass fiber, a larger number of striae are formed to increase the volume of $B_2O_3$ to be volatilized. If the MgO content of the glass fiber is more than 6.0 mass % based on the total amount of the glass fiber, on the other hand, phase separation is enhanced to lower the water resistance, and an excessively high dielectric constant and dissipation factor are provided.

The MgO content in the glass fiber is preferably 2.5 to 5.9 mass %, more preferably 2.9 to 5.8 mass %, even more preferably 3.3 to 5.7 mass %, particularly preferably 3.6 to 5.3 mass %, and most preferably 4.0 to 4.8 mass % based on the total mass of the glass fiber.

If the CaO content in the glass fiber contained in the glass fiber-reinforced resin molded article according to the present invention is less than 2.0 mass % based on the total amount of the glass fiber, excessively poor water resistance is provided concomitantly with causing poor melting. If the CaO content in the glass fiber is more than 6.0 mass % based on the total amount of the glass fiber, on the other hand, an excessively high dielectric constant and dissipation factor are provided.

The CaO content in the glass fiber is preferably 2.6 to 5.5 mass %, more preferably 3.2 to 5.0 mass %, even more preferably 3.7 to 4.7 mass %, particularly preferably 3.9 to 4.5 mass %, and most preferably 4.0 to 4.4 mass % based on the total mass of the glass fiber.

If the $TiO_2$ content in the glass fiber contained in the glass fiber-reinforced resin molded article according to the present invention is less than 1.0 mass % based on the total amount of the glass fiber, the effect of lowering dissipation factor, lowering viscosity, inhibiting melt separation in early stages of melting to reduce scum generated on the surface of a furnace is diminished. If the $TiO_2$ content in the glass fiber is more than 4.0 mass % based on the total amount of the glass fiber, on the other hand, phase separation tends to occur to deteriorate the chemical durability.

The $TiO_2$ content in the glass fiber is preferably 1.3 to 3.0 mass %, more preferably 1.5 to 2.5 mass %, even more preferably 1.6 to 2.3 mass %, particularly preferably 1.7 to 2.1 mass %, and most preferably 1.8 to 2.0 mass % based on the total mass of the glass fiber.

If the $F_2$ content in the glass fiber contained in the glass fiber-reinforced resin molded article according to the present invention is 1.5 mass % or more based on the total amount of the glass fiber, the glass tends to undergo phase separation, and the thermal resistance of the glass may be deteriorated. On the other hand, inclusion of $F_2$ in the glass fiber not only lowers the viscosity of the glass to facilitate melting, but also advantageously lowers the dielectric constant, in particular, the dissipation factor of the glass.

The $F_2$ content in the glass fiber is preferably 0.1 to 1.4 mass %, more preferably 0.3 to 1.3 mass %, even more preferably 0.4 to 1.2 mass %, particularly preferably 0.5 to 1.1 mass %, and most preferably 0.6 to 1.0 mass % based on the total amount of the glass fiber.

If the total amount of $Li_2O$, $Na_2O$, and $K_2O$ in the glass fiber contained in the glass fiber-reinforced resin molded article according to the present invention is 0.6 mass % or more based on the total amount of the glass fiber, an excessively high dissipation factor is provided and the water resistance is also deteriorated. On the other hand, inclusion of $Li_2O$, $Na_2O$, and $K_2O$ lowers the viscosity of the glass to facilitate the melting of the glass.

The sum of the contents of $Li_2O$, $Na_2O$, and $K_2O$ in the glass fiber based on the total amount of the glass fiber is preferably 0.02 to 0.50 mass %, more preferably 0.03 to 0.40 mass %, even more preferably 0.04 to 0.30 mass %, and particularly preferably 0.05 to 0.25 mass %.

The glass fiber contained in the glass fiber-reinforced resin molded article according to the present invention may contain less than 0.4 mass % of an impurity based on the total amount of the glass fiber, in addition to the above-described components. Examples of impurities which may be contained in the glass include $Fe_2O_3$, $Cr_2O_3$, $ZrO_2$, $MoO_3$, $SO_3$, and $Cl_2$. Among these impurities, the content of $Fe_2O_3$ based on the total amount of the glass fiber, which affects absorption of radiant heat in molten glass and coloring of the glass fiber, is preferably 0.05 to 0.15 mass %.

In measurement of the contents by percentage of the above-described components in the glass fiber contained in the glass fiber-reinforced resin molded article according to the present invention, the light element Li can be measured by using an ICP emission spectrometer, and the other elements can be measured by using a wavelength-dispersive fluorescent X-ray analyzer.

An exemplary measurement method is as follows. First, the glass fiber-reinforced resin molded article is, for example, heated in a muffle furnace at 300 to 650° C. for about 0.5 to 24 hours to decompose organic matters. Next, the residual glass fiber is placed in a platinum melting pot, and melted with stirring in an electric furnace while the temperature is retained at 1550° C. for 6 hours, giving homogeneous molten glass. Subsequently, the resulting molten glass is flowed onto a carbon sheet to produce glass cullet, which is then milled into a powder. For the light element Li, the glass powder is decomposed by alkali and acid fusions, and the resultant is then subjected to quantitative analysis with an ICP emission spectrometer. For the other elements, the glass powder is molded into a disk with a pressing machine, and the disk is subjected to quantitative analysis with a wavelength-dispersive fluorescent X-ray analyzer. These quantitative analysis results are converted in terms of oxides of the components to calculate the contents of the components and the total amount, and from these numerical values the contents by percentage of the above-described components can be determined.

In the present invention, the glass fiber contained in the glass fiber-reinforced resin molded article has a number-average fiber length of 30 to 5000 μm. If the number-average fiber length of the glass fiber is smaller than 30 μm, the glass fiber-reinforced resin molded article cannot achieve sufficient tensile strength and impact strength. Meanwhile, it is difficult to set the number-average fiber length of the glass fiber to larger than 5000 μm because the breakage of the glass fiber occurs during production of the glass fiber-reinforced resin molded article.

The number-average fiber length of the glass fiber is preferably 100 to 3000 μm, more preferably 150 to 2000 μm, even more preferably 200 to 1000 μm, particularly preferably 300 to 500 μm, and most preferably 315 to 450 μm.

An exemplary measurement method for the number-average fiber length of the glass fiber contained in the glass fiber-reinforced resin molded article according to the present invention is as follows. First, the glass fiber-reinforced resin molded article is, for example, heated in a muffle furnace at 300 to 650° C. for about 0.5 to 24 hours to decompose organic matters. Next, the residual glass fiber is transferred in a glass petri dish, and dispersed with acetone on the surface of the petri dish. Subsequently, fiber length is measured for 500 or more pieces of the glass fiber dispersed on the surface through a stereomicroscope to calculate the number-average fiber length.

In the present invention, the glass fiber contained in the glass fiber-reinforced resin molded article preferably has noncircular cross-section such that a ratio of a major axis to a minor axis (major axis/minor axis) in a cross-sectional shape is in a range of 2.0 to 10.0 and a fiber diameter determined by converting a cross-sectional area to a true circle equivalent in area (hereinafter, referred to as equivalent fiber diameter) is in a range of 3.0 to 35.0 μm. Improvement rates of tensile strength and Charpy notched impact strength in the case that the glass fiber contained in the glass fiber-reinforced resin molded article has such cross-section are extremely higher than those in the case that the glass fiber has circular cross-section, where the improvement rates are based on the tensile strength and Charpy notched impact strength of a glass fiber-reinforced resin molded article obtained by using an E glass fiber under the same conditions except for composition.

To ensure the high tensile strength and high Charpy notched impact strength of the glass fiber-reinforced resin molded article and easy manufacture of the glass fiber in combination, the ratio of a major axis to a minor axis (major axis/minor axis) in cross-sectional shape in the glass fiber is preferably 2.2 to 6.0, and more preferably 3.2 to 4.5. In the case that the glass fiber is formed of a plurality of glass filaments bundled together, the cross-sectional shape of the glass fiber refers to the cross-sectional shape of the glass filaments forming the glass fiber.

To ensure the high tensile strength and high Charpy notched impact strength of the glass fiber-reinforced resin molded article and easy manufacture of the glass fiber or the glass fiber-reinforced resin molded article in combination, the equivalent fiber diameter of the glass fiber is preferably 6.0 to 20.0 μm, and more preferably 6.5 to 16.0 μm. In the case that the glass fiber is formed of a plurality of glass filaments bundled together, the fiber diameter of the glass fiber refers to the fiber diameter of the glass filaments forming the glass fiber.

In the present invention, in the case that the glass fiber contained in the glass fiber-reinforced resin molded article has circular cross-sectional shape, the fiber diameter can be 3.0 to 35.0 μm.

For excellent flowability in production of the glass fiber-reinforced resin molded article, the noncircular shape of the glass fiber is preferably cocoon shape, oval, or long-oval (a shape formed by adding a semicircle to each of opposite two sides of a rectangle, or a shape similar thereto), and more preferably long-oval.

The glass fiber-reinforced resin molded article according to the present invention can contain both the glass fiber having the noncircular cross-section and a glass fiber having circular cross-section. In the case that both the glass fiber having the noncircular cross-section and a glass fiber having circular cross-section are contained, for example, the ratio of the content by percentage (mass %) of the glass fiber of circular cross-section to the content by percentage (mass %) of the glass fiber of the noncircular cross-section (glass fiber having circular cross-section (mass %)/glass fiber having noncircular cross-section (mass %)) can be 0.1 to 1.0.

In the present invention, the glass fiber contained in the glass fiber-reinforced resin molded article preferably has composition such that a ratio of the $B_2O_3$ content by percentage (mass %) to the $TiO_2$ content by percentage (mass %) ($B_2O_3$ (mass %)/$TiO_2$ (mass %)) is in a range of 9.6 to 11.4.

In the glass fiber, the ratio of the $B_2O_3$ content by percentage (mass %) to the $TiO_2$ content by percentage (mass %) is more preferably 9.8 to 10.8, and even more preferably 10.0 to 10.4.

Inclusion of the glass fiber such that the ratio of the $B_2O_3$ content by percentage (mass %) to the $TiO_2$ content by percentage (mass %) is in the above range allows the glass fiber-reinforced resin molded article according to the present invention to achieve a low dielectric constant and a low dissipation factor in combination, with the productivity in glass melting and spinning kept high.

DESCRIPTION OF EMBODIMENTS

Now, embodiments of the present invention will be described in more detail.

The glass fiber-reinforced resin molded article according to the present embodiments contains: 10 to 90 mass % of a glass fiber; and 90 to 10 mass % of a resin based on the total amount of the glass fiber-reinforced resin molded article, wherein the glass fiber has composition containing: 52.0 to 57.0 mass % of $SiO_2$; 13.0 to 17.0 mass % of $Al_2O_3$; 15.0 to 21.5 mass % of $B_2O_3$; 2.0 to 6.0 mass % of MgO; 2.0 to 6.0 mass % of CaO; 1.0 to 4.0 mass % of $TiO_2$; and less than 1.5 mass % of $F_2$, provided that the total amount of $Li_2O$, $Na_2O$, and $K_2O$ is less than 0.6 mass %, based on the total amount of the glass fiber, and the glass fiber has a number-average fiber length of 30 to 5000 μm.

The glass fiber having the composition and number-average fiber length within the above-described ranges allows the glass fiber-reinforced resin molded article to achieve high tensile strength and high impact strength together with a low dielectric constant and a low dissipation factor.

Use of the glass fiber satisfying the above ranges is not limited to reinforcing materials in glass fiber-reinforced resin molded articles, and can be suitably used for reinforcing materials for inorganic materials such as plaster and cement. In using as a reinforcing material for plaster (especially, a plasterboard of 4 to 60 mm in thickness), the glass fiber satisfying the above ranges can be contained in an amount of 0.1 to 4.0 mass % based on the total mass of the plaster to contribute to enhancement of the mechanical strength, fireproof performance, dimension stability, and so forth of the plaster. The glass fiber satisfying the above ranges can be present in plaster with a number-average fiber length of 30 to 25000 μm.

The glass fiber is manufactured in the following manner: first, a glass raw material (glass batch) formulated to attain the above-described composition is fed to a melting furnace, and melted, for example, at a temperature of 1450 to 1550° C.; next, the melted glass batch (molten glass) is discharged from nozzle tips of a bushing the temperature of which is controlled to a predetermined temperature, and quickly reeled off for cooling with stretching to solidify, forming a glass fiber. Here, the glass fiber formed is typically a bundle of a plurality of glass filaments (e.g., 50 to 8000 glass filaments) each drawn from one nozzle tip. The glass fiber typically has circular cross-section.

Applicable as the nozzle tips when a glass fiber having noncircular cross-section such that the ratio of a major axis to a minor axis (major axis/minor axis) in cross-sectional shape is 2.0 to 10.0 is manufactured is, for example, a nozzle plate provided at the bottom of a bushing and including: openings (orifices) in each of which the ratio of the major axis to the minor axis (major axis/minor axis) in cross-sectional shape is 2.0 to 10.0, the major axis of the opening diameter is 1.0 to 10.0 mm, and the minor axis is 0.5 to 2.0 mm; and cooling units such as notches and protrusions to quickly cool molten glass which has passed through each opening.

The glass fiber has a weight of 100 to 10000 tex (g/km) as a consequence of bundling of a plurality of glass filaments.

During formation of the glass fiber, the surface of the glass fiber is coated with an organic matter for the purpose of, for example, enhancing bundling of filaments, enhancing bonding between the glass fiber and the resin, and enhancing homogeneous dispersibility of the glass fiber in a mixture of the glass fiber and the resin or an inorganic material. Examples of such organic matters include urethane resin, epoxy resin, vinyl acetate resin, acrylic resin, modified polypropylene (in particular, carboxylic acid-modified polypropylene), and copolymers of a (poly)carboxylic acid (in particular, maleic acid) and an unsaturated monomer, and urethane resin, epoxy resin, or a mixture of these resins can be preferably used. A resin composition containing a silane coupling agent, a lubricant, and a surfactant in addition to those resins can be used.

Examples of the silane coupling agent include aminosilane (e.g., γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, γ-aminopropyltrimethoxysilane), chlorosilane (e.g., γ-glycidoxypropyltrimethoxysilane), epoxysilane (e.g., β-(3,4-epoxycyclohexyl)ethyltrimethoxysilane), mercaptosilane (e.g., γ-mercaptotrimethoxysilane like γ-chloropropyltrimethoxysilane), vinylsilane (e.g., vinyltrimethoxysilane, N-β-(N-vinybenzylaminoethyl)-γ-aminopropyltrimethoxysilane), and acrylsilane (e.g., γ-methacryloxypropyltrimethoxysilane). One of these or a combination of two or more thereof can be used.

Examples of the lubricant include modified silicone oil, animal oil (e.g., beef tallow) and hydrogenated products thereof, vegetable oil (e.g., soybean oil, coconut oil, rapeseed oil, palm oil, castor oil) and hydrogenated products thereof, animal wax (e.g., beeswax, lanolin), vegetable wax (e.g., candelilla wax, carnauba wax), mineral wax (e.g., paraffin wax, montan wax), condensates of higher saturated fatty acid and higher saturated alcohol (e.g., stearates such as lauryl stearate), polyethyleneimine, polyalkylpolyamine alkylamide derivatives, fatty acid amide (e.g., dehydration condensates of polyethylenepolyamine such as diethylenetriamine, triethylenetetramine, and tetraethylenepentamine, and fatty acid such as lauric acid, myristic acid, palmitic acid, and stearic acid), and quaternary ammonium salts (e.g., alkyltrimethylammonium salts such as lauryltrimethylammonium chrolide). One of these or a combination of two or more thereof can be used.

Examples of the surfactant include nonionic surfactants, cationic surfactants, anionic surfactants, and amphoteric surfactants. One of these or a combination of two or more thereof can be used.

Examples of nonionic surfactants include ethylene oxide propylene oxide alkyl ether, polyoxyethylene alkyl ether, polyoxyethylene-polyoxypropylene-block copolymer, alkylpolyoxyethylene-polyoxypropylene-block copolymer ether, polyoxyethylene resin acid ester, polyoxyethylene fatty acid monoester, polyoxyethylene fatty acid diester, polyoxyethylenesorbitan fatty acid ester, ethylene oxide adducts of glycerol fatty acid ester, polyoxyethylene castor oil ether, ethylene oxide adducts of hydrogenated castor oil, ethylene oxide adducts of alkylamine, ethylene oxide adducts of fatty acid amide, glycerol fatty acid ester, polyglycerin fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adducts of acetylene glycol, and ethylene oxide adducts of acetylene alcohol.

Examples of cationic surfactants include alkyldimethybenzylammonium chloride, alkyltrimethylammonium chloride, alkyldimethylethylammonium ethylsulfate, higher alkylamine salts (e.g., acetates, hydrochlorides), ethylene oxide adducts of higher alkylamine, condensates of higher fatty acid and polyalkylenepolyamine, salts of ester of higher fatty acid and alkanolamine, salts of higher fatty acid amide, imidazoline-based cationic surfactants, and alkylpyridinium salts.

Examples of anionic surfactants include higher alcohol sulfate salts, higher alkyl ether sulfate salts, α-olefin sulfate salts, alkylbenzenesulfonates, α-olefinsulfonates, reaction products of fatty acid halide and N-methyltaurine, dialkyl sulfosuccinate salts, higher alcohol phosphate salts, and phosphate salts of ethylene oxide adducts of higher alcohol.

Examples of amphoteric surfactants include amino acid-based amphoteric surfactants such as alkali metal salts of alkylaminopropionic acid, betaine-based amphoteric surfactants such as alkyldimethylbetaine, and imidazoline-based amphoteric surfactants.

Such a resin composition coats the glass fiber with a proportion of 0.1 to 2.0 mass % based on the mass of the glass fiber not coated with the resin composition. To coat the glass fiber with the organic matter, for example, in a production process for the glass fiber a resin solution or resin composition solution is applied to the glass fiber by using a known method such as a roller applicator, and the glass fiber to which the resin solution or resin composition solution has been applied is then dried.

Although a thermoplastic resin or a thermosetting resin can be used for the resin, use of a thermoplastic resin is preferred because most of the applications require achievement of high tensile strength and high impact strength in combination with a low dielectric constant and a low dissipation factor.

Examples of the thermoplastic resin include polyethylene, polypropylene, polystyrene, styrene/maleic anhydride resin, styrene/maleimide resin, polyacrylonitrile, acrylonitrile/styrene (AS) resin, acrylonitrile/butadiene/styrene (ABS) resin, chlorinated polyethylene/acrylonitrile/styrene (ACS) resin, acrylonitrile/ethylene/styrene (AES) resin, acrylonitrile/styrene/methyl acrylate (ASA) resin, styrene/acrylonitrile (SAN) resin, methacrylic resin, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyarylketone, liquid crystal polymer (LCP), fluororesin, polyetherimide (PEI), polyarylate (PAR), polysulfone (PSF), polyethersulfone (PES), polyamideimide (PAI), polyaminobismaleimide (PABM), thermoplastic polyimide (TPI), polyethylenenaphthalene (PEN), ethylene/vinyl acetate (EVA) resin, ionomer (IO) resin, polybutadiene, styrene/butadiene resin, polybutylene, polymethylpentene, olefin/vinyl alcohol resin, cyclic olefin resin, cellulose resin, and polylactic acid. Among these, polyamide, polybutylene terephthalate, polycarbonate, and polystyrene (in particular, syndiotactic polystyrene) are preferred, and polyamide is more preferred, because most of the applications require achievement of high tensile strength and high impact strength in combination with a low dielectric constant and a low dissipation factor.

Specific examples of polyethylene include general-purpose polystyrene (GPPS), high-density polyethylene (HDPE), medium-density polyethylene, low-density polyethylene (LDPE), linear low-density polyethylene (LLDPE), and ultra-high-molecular-weight polyethylene.

Examples of polypropylene include isotactic polypropylene, atactic polypropylene, syndiotactic polypropylene, and mixtures of any of them.

Examples of polystyrene include general-purpose polystyrene (GPPS), which is atactic polystyrene having atactic structure, high-impact polystyrene (HIPS), which is produced by adding a rubber component to GPPS, and syndiotactic polystyrene, which has syndiotactic structure.

Examples of methacrylic resin include polymers formed through homopolymerization of one of acrylic acid, methacrylic acid, styrene, methyl acrylate, ethyl acrylate, ethyl methacrylate, butyl acrylate, butyl methacrylate, and fatty acid vinyl ester, and polymers formed through copolymerization of two or more of them.

Examples of polyvinyl chloride include vinyl chloride homopolymers formed through polymerization using a conventionally known emulsion polymerization method, suspension polymerization method, microsuspension polymerization method, bulk polymerization method, or the like; copolymers of the vinyl chloride monomer and a monomer copolymerizable therewith; and graft copolymers formed by subjecting a polymer to graft polymerization with the vinyl chloride monomer.

Examples of polyamide include one of the following components, and copolymers formed by combining two or more of the following components: polycaproamide (nylon 6), polyhexamethyleneadipamide (nylon 66), polytetramethyleneadipamide (nylon 46), polytetramethylenesebacamide (nylon 410), polypentamethyleneadipamide (nylon 56), polypentamethylenesebacamide (nylon 510), polyhexamethylenesebacamide (nylon 610), polyhexamethylenedodecamide (nylon 612), polydecamethyleneadipamide (nylon 106), polydecamethylenesebacamide (nylon 1010), polydecamethylenedodecamide (nylon 1012), polyundecanamide (nylon 11), polyundecamethyleneadipamide (nylon 116), polydodecanamide (nylon 12), polyxyleneadipamide (nylon XD6), polyxylenesebacamide (nylon XD10), poly-m-xylyleneadipamide (nylon MXD6), poly-p-xylyleneadipamide (nylon PXD6), polytetramethyleneterephthalamide (nylon 4T), polypentamethyleneterephthalamide (nylon 5T), polyhexamethyleneterephthalamide (nylon 6T), polyhexamethyleneisophthalamide (nylon 61), polynonamethyleneterephthalamide (nylon 9T), polydecamethyleneterephthalamide (nylon 10T), polyundecamethyleneterephthalamide (nylon 11T), polydodecamethyleneterephthalamide (nylon 12T), polytetramethyleneisophthalamide (nylon 41), polybis(3-methyl-4-aminohexyl)methaneterephthalamide (nylon PACMT), polybis(3-methyl-4-aminohexyl)methaneisophthalamide (nylon PACMI), polybis(3-methyl-4-aminohexyl)methanedodecamide (nylon PACM12), polybis(3-methyl-4-aminohexyl)methanetetradecamide (nylon PACM14), and so forth; and mixtures of any of them.

Examples of polyacetal include homopolymers including oxymethylene units as main repeating units, and copolymers including oxyalkylene units having two to eight consecutive carbon atoms in the main chain.

Examples of polyethylene terephthalate include polymers obtained through polycondensation of terephthalic acid or a derivative thereof and ethylene glycol.

Examples of polybutylene terephthalate include polymers obtained through polycondensation of terephthalic acid or a derivative thereof and 1,4-butanediol.

Examples of polytrimethylene terephthalate include polymers obtained through polycondensation of terephthalic acid or a derivative thereof and 1,3-propanediol.

Examples of polycarbonate include polymers obtained through a transesterification method to react a dihydroxydiaryl compound and a carbonate such as diphenyl carbonate in a molten state; and polymers obtained through a phosgene method to react a dihydroxyaryl compound and phosgene.

Examples of polyarylene sulfide include linear polyphenylene sulfide, crosslinked polyphenylene sulfide, formed by curing reaction after polymerization to impart high molecular weight, polyphenylene sulfide sulfone, polyphenylene sulfide ether, and polyphenylene sulfide ketone.

Examples of modified polyphenylene ether include polymer alloy of poly(2,6-dimethyl-1,4-phenylene) ether and polystyrene, polymer alloy of poly(2,6-dimethyl-1,4-phenylene) ether and styrene/butadiene copolymer, polymer alloy of poly(2,6-dimethyl-1,4-phenylene) ether and styrene/maleic anhydride copolymer, polymer alloy of poly(2,6-dimethyl-1,4-phenylene) ether and polyamide, and polymer alloy of poly(2,6-dimethyl-1,4-phenylene) ether and styrene/butadiene/acrylonitrile copolymer.

Examples of polyarylketone include polyetherketone (PEK), polyetheretherketone (PEEK), polyetherketoneketone (PEKK), and polyetheretherketoneketone (PEEKK).

Examples of liquid crystal polymer (LCP) include (co) polymers, as thermotropic liquid crystal polyester, consisting of one or more constituent units selected from aromatic hydroxycarbonyl units, aromatic dihydroxy units, aromatic dicarbonyl units, aliphatic dihydroxy units, aliphatic dicarbonyl units, and so forth.

Examples of fluororesin include polytetrafluoroethylene (PTFE), perfluoroalkoxy resin (PFA), fluorinated ethylene propylene resin (FEP), fluorinated ethylene tetrafluoroethylene resin (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of ionomer (IO) resin include copolymers of an olefin or styrene and an unsaturated carboxylic acid with some of the carboxy groups neutralized with metal ions.

Examples of olefin/vinyl alcohol resin include ethylene/vinyl alcohol copolymer, propylene/vinyl alcohol copolymer, saponified products of ethylene/vinyl acetate copolymer, and saponified products of propylene/vinyl acetate copolymer.

Examples of cyclic olefin resin include polymers of a monocyclic form such as cyclohexene, polymers of a polycyclic form such as tetracyclopentadiene, and polymers of a cyclic olefin monomer.

Examples of polylactic acid include poly-L-lactic acid, which is an L-form homopolymer, poly-D-lactic acid, which is a D-form homopolymer, and polylactic acid of stereocomplex-type, which is a mixture of them.

Examples of cellulose resin include methylcellulose, ethylcellulose, hydroxycellulose, hydroxymethylcellulose, hydroxyethylcellulose, hydroxyethylmethylcellulose, hydroxypropylmethylcellulose, cellulose acetate, cellulose propionate, and cellulose butyrate.

Examples of the thermosetting resin include unsaturated polyester resin, vinyl ester resin, epoxy (EP) resin, melamine (MF) resin, phenolic resin (PF), urethane resin (PU), polyisocyanate, polyisocyanurate, polyimide (PI), urea (UF) resin, silicone (SI) resin, furan (FR) resin, benzoguanamine (BR) resin, alkyd resin, xylene resin, bismaleimide triazine (BT) resin, and diallyl phthalate resin (PDAP).

Specific examples of unsaturated polyester include resins obtained through esterification reaction of an aliphatic unsaturated dicarboxylic acid and an aliphatic diol.

Examples of vinyl ester resin include bis-based vinyl ester resin and novolac-based vinyl ester resin.

Examples of epoxy resin include bisphenol A-based epoxy resin, bisphenol F-based epoxy resin, bisphenol E-based epoxy resin, bisphenol S-based epoxy resin, bisphenol M-based epoxy resin (4,4'-(1,3-phenylenediisopropylidene)bisphenol-based epoxy resin), bisphenol P-based epoxy resin (4,4'-(1,4-phenylenediisoprydiene)bisphenol-based epoxy resin), bisphenol Z-based epoxy resin (4,4'-cyclohexylidenebisphenol-based epoxy resin), phenol novolac-based epoxy resin, cresol novolac-based epoxy resin, novolac-based epoxy resin of tetraphenol group-containing ethane-type, novolac-based epoxy resin with fused-ring aromatic hydrocarbon structure, biphenyl-based epoxy resin, aralkyl-based epoxy resin such as xylylene-based epoxy resin and phenyl aralkyl-based epoxy resin, naphthylene ether-based epoxy resin, naphthol-based epoxy resin, naphthalenediol-based epoxy resin, bi- to tetrafunctional epoxy-based naphthalene resin, binaphthyl-based epoxy resin, naphthalenearalkyl-based epoxy resin, anthracene-based epoxy resin, phenoxy-based epoxy resin, dicyclopentadiene-based epoxy resin, norbornene-based epoxy resin, adamantane-based epoxy resin, and fluorene-based epoxy resin.

Examples of melamine resin include polymers formed through polycondensation of melamine (2,4,6-triamino-1,3,5-triazine) and formaldehyde.

Examples of phenolic resin include novolac-based phenol resin such as phenol novolac resin, cresol novolac resin, and bisphenol A-based novolac resin, resole-based phenolic resin such as methylol-based resole resin and dimethylene ether-based resole resin, and arylalkylene-based phenolic resin, and, for example, one of them or a combination of two or more of them is applicable.

Examples of urea resin include resins obtained through condensation of urea and formaldehyde.

For the thermoplastic resin or thermosetting resin, one resin may be used, and two or more resins may be used in combination.

The glass fiber-reinforced resin molded article according to the present invention can contain a component other than the glass fiber and the resin, unless the component interferes with the object of the present invention. Examples of the component include glass fibers other than the glass fiber (e.g., E glass fibers, S glass fibers), reinforcing fibers other than glass fibers (e.g., carbon fibers, metal fibers), fillers other than glass fibers (e.g., glass powders, talc, mica), flame retardants, ultraviolet absorbers, thermal stabilizers, antioxidants, antistatic agents, flowability improvers, anti-blocking agents, lubricants, nucleating agents, antibacterial agents, and pigments. The glass fiber-reinforced resin molded article according to the present invention can contain 0 to 40 mass % in total of these components, based on the total amount of the glass fiber-reinforced resin molded article.

Examples of molding methods to obtain the glass fiber-reinforced resin molded article according to the present invention include injection molding methods, injection-compression molding methods, two-color molding methods, hollow molding methods, foam molding methods (including those using supercritical fluid), insert molding methods, in-mold coating molding methods, extrusion molding methods, sheet molding methods, thermoforming methods, rotational molding methods, laminate molding methods, press molding methods, blow molding methods, stamping molding methods, infusion methods, hand lay-up methods, spray-up methods, resin transfer molding methods, sheet molding compound methods, bulk molding compound methods, pultrusion methods, and filament winding methods. Among these methods, injection molding methods are preferred because of the superior production efficiency.

When the glass fiber-reinforced resin molded article according to the present invention is manufactured by using an injection molding method, for example, pieces of a glass fiber each having a length of 1 to 25 mm cut out from a bundle formed of a plurality of glass filaments (chopped strands) are kneaded with resin, and the resultant is pushed out from a nozzle and processed into pellets by cutting into pieces of predetermined length (e.g., 1 to 50 mm), which can be used as a molding raw material. Alternatively, a glass fiber, as a bundle formed of a plurality of glass filaments, continuously reeled (roving) is impregnated with melted thermoplastic resin, cooled, and then processed into pellets by cutting into pieces of predetermined length (e.g., 1 to 50 mm), which can be used as a molding raw material.

Examples of applications of the glass fiber-reinforced resin molded article according to the present invention include housings in electronic devices, electronic parts, exterior members for vehicles (e.g., bumpers, fenders, hoods, air dams, wheel covers), interior members for vehicles (e.g., door trims, ceiling materials), members for vehicle engines (e.g., oil pans, engine covers, intake manifolds, exhaust manifolds), muffler-related members (e.g., noise reduction members), and high-pressure tanks. Housings and parts in portable electronic devices including smartphones, tablet computers, laptop computers, portable audio player, and handheld game consoles, for which achievement of high tensile strength and high Charpy notched impact strength in combination with a low dielectric constant and a low dissipation factor, are preferred as an application of the glass fiber-reinforced resin molded article according to the present invention.

Now, Examples of the present invention and Comparative Examples will be demonstrated.

EXAMPLES

[Glass Composition]
Two glass compositions shown in Table 1 were used. Composition 1 is glass composition of a glass fiber for the glass fiber-reinforced resin molded article according to the present invention, and Composition 2 corresponds to E glass composition.

TABLE 1

|  |  | Composition 1 | Composition 2 |
|---|---|---|---|
| $SiO_2$ | (mass %) | 54.5 | 54.6 |
| $Al_2O_3$ | (mass %) | 14.6 | 14.1 |

TABLE 1-continued

|  |  | Composition 1 | Composition 2 |
|---|---|---|---|
| $B_2O_3$ | (mass %) | 19.4 | 6.1 |
| MgO | (mass %) | 4.2 | 1.2 |
| CaO | (mass %) | 4.1 | 22.4 |
| $TiO_2$ | (mass %) | 1.9 | 0.3 |
| $F_2$ | (mass %) | 1.0 | 0.6 |
| $Li_2O + Na_2O + K_2O$ | (mass %) | 0.2 | 0.5 |
| $Fe_2O_3$ | (mass %) | 0.1 | 0.2 |
| $B_2O_3/TiO_2$ |  | 10.2 | 20.3 |

[Resin]
UBE NYLON 1015B (product name, from Ube Industries, Ltd.) was used as polyamide resin (in tables, indicated as PA).

Duranex 2000 (product name, from POLYPLASTICS CO., LTD.) was used as polybutylene terephthalate resin (in tables, indicated as PBT).

[Tensile Strength]
The tensile strength of each glass fiber-reinforced resin molded article was measured in accordance with ISO527-1,2.

[Charpy Notched Impact Strength]
The Charpy notched impact strength of each glass fiber-reinforced resin molded article was measured in accordance with ISO179.

[Dielectric Constant]
The dielectric constant of each glass fiber-reinforced resin molded article was measured in accordance with JIS C 2565. The measurement frequency was 10 GHz.

[Dissipation Factor]
The dissipation factor of each glass fiber-reinforced resin molded article was measured in accordance with JIS C 2565. The measurement frequency was 10 GHz.

Examples 1 and 2, Comparative Examples 1 and 2

As shown in Table 2, each glass fiber-reinforced resin molded article consisting of a glass fiber having Composition 1 or Composition 2 and having circular cross-section or long-oval cross-section and the polyamide resin was evaluated for the tensile strength, Charpy notched impact strength, dielectric constant, and dissipation factor, where the case with a glass fiber having Composition 1 and having circular cross-section was defined as Example 1, the case with a glass fiber having Composition 1 and having oval cross-section as Example 2, the case with a glass fiber having Composition 2 and having circular cross-section as Comparative Example 1, and the case with a glass fiber having Composition 2 and having oval cross-section as Comparative Example 2.

In Table 2, each fiber diameter for glass fibers having oval cross-sectional shape indicates a fiber diameter determined from a true circle equivalent in area to the cross-section (equivalent fiber diameter).

TABLE 2

|  |  | Example 1 | Example 2 | Comparative Example 1 | Comparative Example 2 |
|---|---|---|---|---|---|
| Glass fiber | Composition | Composition 1 | Composition 1 | Composition 2 | Composition 2 |
|  | Fiber diameter (μm) | 11 | 15 | 11 | 15 |
| Cross-section | Shape | circle | long-oval | circle | long-oval |
|  | Major axis/minor axis | 1.0 | 4.0 | 1.0 | 4.0 |
| Coating | Type of resin | urethane | urethane | urethane | urethane |
|  | Coating rate (mass %) | 0.6 | 0.6 | 0.6 | 0.6 |
| Number-average fiber length in molded article (μm) |  | 300 | 330 | 300 | 330 |

TABLE 2-continued

|  |  | Example 1 | Example 2 | Comparative Example 1 | Comparative Example 2 |
|---|---|---|---|---|---|
| Resin | Content by percentage in molded article (mass %) | 50 | 50 | 50 | 50 |
|  | Type of resin | PA | PA | PA | PA |
|  | Content by percentage in molded article (mass %) | 50 | 50 | 50 | 50 |
| Molded article | Tensile strength (MPa) | 227.4 | 229.6 | 232.1 | 236.5 |
|  | Charpy notched impact strength (kJ/m$^2$) | 35 | 41 | 33 | 36 |
|  | Dielectric constant | 3.39 | 3.43 | 3.96 | 3.91 |
|  | Dissipation factor | 0.0109 | 0.0109 | 0.0129 | 0.0126 |

As demonstrated in Table 2, the glass fiber-reinforced resin molded article in Example 1, which had a glass composition specified in the present invention, had a tensile strength comparable to that of the glass fiber-reinforced resin molded article in Comparative Example 1 (difference of less than ±5.0% based on Comparative Example 1), which had completely the same configuration as in Example 1 except having E glass composition, but had enhanced Charpy notched impact strength (an increase rate of 5.0% or more based on Comparative Example 1) and a significantly reduced dielectric constant and dissipation factor (lowering rates of 10.0% or more based on Comparative Example 1).

As demonstrated in Table 2, the glass fiber-reinforced resin molded article in Example 2, which had a glass composition specified in the present invention, had a tensile strength comparable to that of the glass fiber-reinforced resin molded article in Comparative Example 2 (difference of less than ±5.0% based on Comparative Example 2), which had completely the same configuration as in Example 2 except having E glass composition, but had enhanced Charpy notched impact strength (an increase rate of 10.0% or more based on Comparative Example 2) and a significantly reduced dielectric constant and dissipation factor (lowering rates of 10.0% or more based on Comparative Example 2).

As is clear from comparison between Example 1 and Comparative Example 1 and comparison between Example 2 and Comparative Example 2, the effect of increasing the Charpy notched impact strength of a glass fiber-reinforced resin molded article through use of a glass composition specified in the present invention is higher when the cross-sectional shape of a glass fiber is noncircular (long-oval) than when the cross-sectional shape of a glass fiber is circular.

Example 3, Comparative Example 3

As shown in Table 3, each glass fiber-reinforced resin molded article consisting of a glass fiber having Composition 1 or Composition 2 and having long-oval cross-section and the polybutylene terephthalate resin was evaluated for the tensile strength, Charpy notched impact strength, dielectric constant, and dissipation factor, where the case with a glass fiber having Composition 1 was defined as Example 3, and the case with a glass fiber having Composition 2 as Comparative Example 3.

In Table 3, each fiber diameter for glass fibers having long-oval cross-sectional shape indicates a fiber diameter determined from a true circle equivalent in area to the cross-section (equivalent fiber diameter).

TABLE 3

|  |  | Example 3 | Comparative Example 3 |
|---|---|---|---|
| Glass fiber | Composition | Composition 1 | Composition 2 |
|  | Fiber diameter (μm) | 15 | 15 |
|  | Cross-section Shape | long-oval | long-oval |
|  | Major axis/minor axis | 4.0 | 4.0 |
|  | Coating Type of resin | epoxy | epoxy |
|  | Coating rate (mass %) | 0.9 | 0.9 |
|  | Number-average fiber length in molded article (μm) | 320 | 320 |
|  | Content by percentage in molded article (mass %) | 30 | 30 |
| Resin | Type of resin | PBT | PBT |
|  | Content by percentage in molded article (mass %) | 70 | 70 |
| Molded article | Tensile strength (MPa) | 143.9 | 150.5 |
|  | Charpy notched impact strength (kJ/m$^2$) | 21 | 20 |
|  | Dielectric constant | 3.16 | 3.37 |
|  | Dissipation factor | 0.00572 | 0.00703 |

As demonstrated in Table 3, the glass fiber-reinforced resin molded article in Example 3, which had a glass composition specified in the present invention, had a tensile strength comparable to that of the glass fiber-reinforced resin molded article in Comparative Example 3 (difference of less than ±5.0% based on Comparative Example 3), which had completely the same configuration as in Example 3 except having E glass composition, but had enhanced Charpy notched impact strength (an increase rate of 5.0% or more based on Comparative Example 3), a reduced dielectric constant (a lowering rate of 5.0% or more based on Comparative Example 3), and a significantly reduced dissipation factor (a lowering rate of 10.0% or more based on Comparative Example 3).

The invention claimed is:

1. A glass fiber-reinforced resin molded article comprising:
a glass fiber in a range of 10 to 90 mass %; and
a resin in a range of 90 to 10 mass % based on a total amount of the glass fiber reinforced resin molded article, wherein
the glass fiber has composition comprising:
$SiO_2$ in a range of 52.0 to 57.0 mass %;
$Al_2O_3$ in a range of 13.0 to 17.0 mass %;
$B_2O_3$ in a range of 15.0 to 21.5 mass %;
MgO in a range of 2.0 to 6.0 mass %;
CaO in a range of 2.0 to 6.0 mass %;
$TiO_2$ in a range of 1.0 to 4.0 mass %; and
less than 1.5 mass % of $F_2$, provided that the total amount of $Li_2O$, $Na_2O$, and $K_2O$ is less than 0.6 mass %, based on the total amount of the glass fiber, the total amount of $Fe_2O_3$, $Cr_2O_3$, $ZrO_2$, $MoO_3$, $SO_3$, and $Cl_2$ is less than 0.4 mass %, $Fe_2O_3$ in a range of 0.05 to 0.15 mass %, and the glass fiber has a number-average fiber length in a range of 30 to 5000 μm.

2. The glass fiber-reinforced resin molded article according to claim 1, wherein the glass fiber comprises noncircular cross-section such that a ratio of a major axis to a minor axis (major axis/minor axis) in a cross-sectional shape is in a range of 2.0 to 10.0 and a fiber diameter determined by converting a cross-sectional area to a true circle equivalent in area is in a range of 3.0 to 35.0 μm.

3. The glass fiber-reinforced resin molded article according to claim 1, wherein the glass fiber has composition such that a ratio of the $B_2O_3$ content by percentage (mass %) to the $TiO_2$ content by percentage (mass %) ($B_2O_3$(mass %)/$TiO_2$(mass %)) is in a range of 9.6 to 11.4.

* * * * *